United States Patent
Roberts et al.

(10) Patent No.: US 8,431,756 B2
(45) Date of Patent: Apr. 30, 2013

(54) CONVERSION CATALYSTS AND PROCESSES HAVING OXYGENATE AND WATER STABILITY

(75) Inventors: Virginia M. Roberts, Summit, NJ (US); Michel Daage, Hellertown, PA (US); William J. Novak, Bedminster, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/302,145

(22) Filed: Nov. 22, 2011

(65) Prior Publication Data

US 2012/0142984 A1    Jun. 7, 2012

Related U.S. Application Data

(60) Provisional application No. 61/422,405, filed on Dec. 13, 2010.

(51) Int. Cl.
    *C07C 1/20* (2006.01)
(52) U.S. Cl.
    USPC .......................................... 585/240; 585/242
(58) Field of Classification Search .................. None
    See application file for complete search history.

(56) References Cited

U.S. PATENT DOCUMENTS

| | | | |
|---|---|---|---|
| 2006/0207166 A1* | 9/2006 | Herskowitz et al. | 44/385 |
| 2009/0166256 A1 | 7/2009 | Lewis et al. | |
| 2009/0294324 A1 | 12/2009 | Brandvold et al. | |
| 2009/0300970 A1* | 12/2009 | Perego et al. | 44/307 |
| 2010/0160698 A1* | 6/2010 | Perego et al. | 585/240 |
| 2010/0175308 A1 | 7/2010 | Cole et al. | |
| 2011/0287503 A1 | 11/2011 | Lupton et al. | |
| 2012/0090223 A1 | 4/2012 | Kokayeff et al. | |

OTHER PUBLICATIONS

PCT International Search Report issued Apr. 5, 2012 in corresponding PCT Application No. PCT/US11/62606, 2 pages.
PCT Written Opinion issued Apr. 5, 2012 in corresponding PCT Application No. PCT/US11/62606, 4 pages.

* cited by examiner

*Primary Examiner* — Tam M Nguyen

(57) ABSTRACT

This invention relates to a method for processing oxygenated hydrocarbons to form a hydroisomerized and/or dewaxed hydrocarbon product having a reduced oxygen content, an increased iso-paraffin content, a low n-paraffin content, and good cold flow properties. Advantageously, the method can utilize a zeolitic base catalyst, optionally but preferably containing at least one activated metal component, and a hydrothermally-stable binder such as titania.

14 Claims, 1 Drawing Sheet

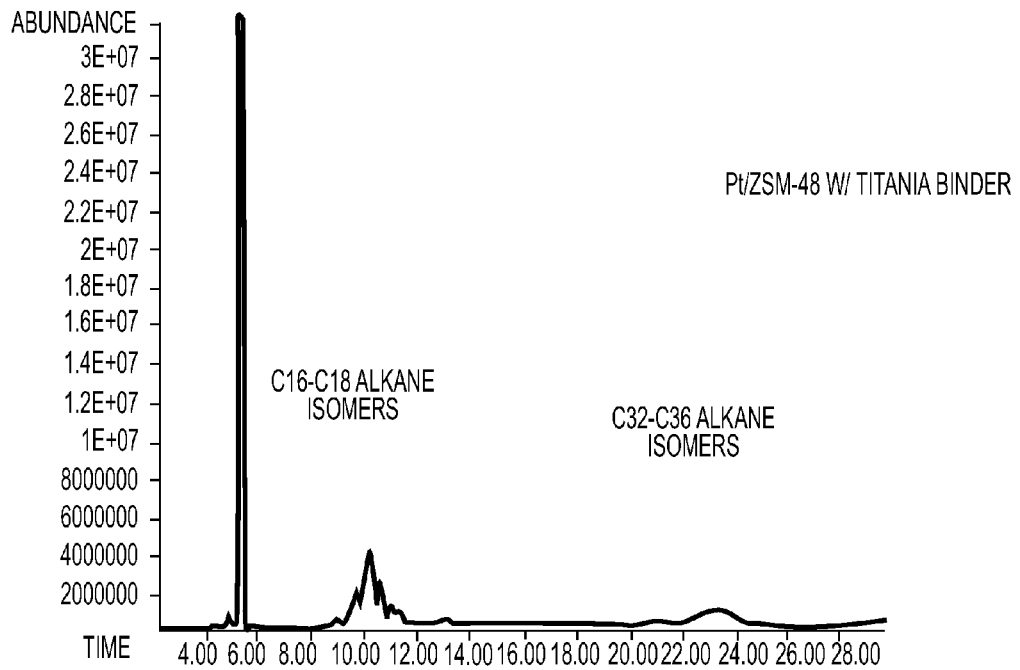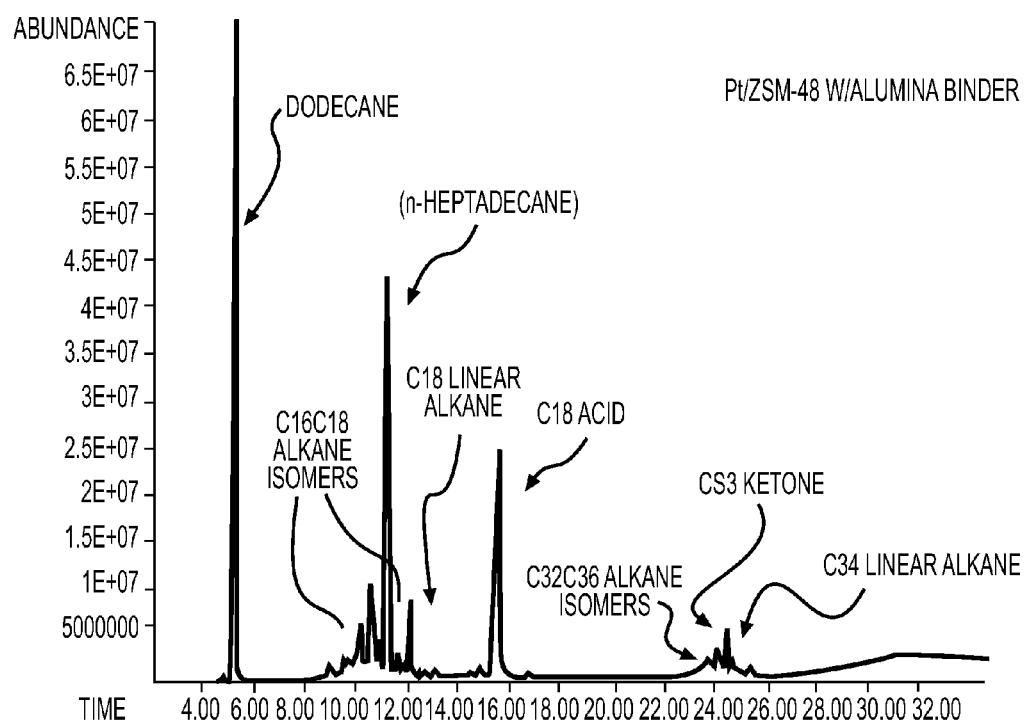

US 8,431,756 B2

CONVERSION CATALYSTS AND PROCESSES HAVING OXYGENATE AND WATER STABILITY

CROSS-REFERENCE TO RELATED APPLICATIONS

This application relates to and claims priority to U.S. Provisional Patent Application No. 61/422,405 of the same title filed Dec. 13, 2010.

FIELD OF THE INVENTION

This invention relates to a method for processing oxygenated hydrocarbons to form a hydroisomerized and/or dewaxed hydrocarbon product having reduced oxygen content, increased iso-paraffin content, low n-paraffin content, and good cold flow properties.

BACKGROUND OF THE INVENTION

With decreasing availability of fossil carbon resources, there is bound to be an increasing demand for alternative resources for chemical energy carriers and functional molecules. Biomass feedstocks present an enormous potential in this respect, as they are renewable and can be $CO_2$ neutral. In contrast to crude oil, however, biomass and biomass-derived materials typically contain large concentrations of oxygenates. In most cases, the oxygen atoms are removed as water during deoxygenation processing, and, in some cases such as pyrolysis oil, the feed already contains large amounts of water.

Water is known to have a deactivating effect on many catalytic systems used in refinery-type processes. Catalysts containing alumina are known to be very sensitive to water, even at very low concentrations (in the parts per million range). Several prior art references describing catalyst compositions effective for deoxygenation also note the necessity for maintaining low oxygenate concentrations in the feedstocks.

For instance, the article by J. Hancsok et al. (*Microporous and Mesoporous Materials*, 101 (2007), 148-152) describes a metal/zeolite catalyst used for isomerizing oxygenate-containing feedstocks. The catalyst is bound with alumina, and it is noted that oxygenate contents of just over 1% in the feedstock cause a 50% acidity loss, indicating a reduced conversion activity. Additionally, the article by O. V. Kikhtyanin et al. (*Fuel*, 89 (2010), 3085-3092) describes a metal/SAPO catalyst, also bound with alumina, which is used for hydroconversion of sunflower oil. It was noted that fast deactivation was observed in tandem with high oxygenate concentrations (relative to non-oxygenated hydrocarbon concentrations), although the goal of the study was to find processing conditions that mitigated such issues.

Indeed, catalysts containing alumina can be among the most effective catalysts for many necessary processes, such as heteroatom removal (e.g., deoxygenation) and isomerization. Water-induced deactivation of such catalysts can occur via numerous mechanisms (e.g., sintering, titration of acid sites, competitive adsorption, zeolite support dealumination, and reduction of mechanical stability, inter alia), and such deactivation should be an increasingly important issue, due to the increasing demand for biofuels and other biomass-derived products.

SUMMARY OF THE INVENTION

What is described herein are alternate solutions to the water deactivation problem by substituting alumina in catalytic compositions with more hydrophilic and/or hydrothermally-stable components such as titania.

One aspect of this invention relates to a method for processing oxygenated hydrocarbons to remove oxygen and to form a hydroisomerized and/or dewaxed hydrocarbon product, which process comprises a number of steps. The first step is providing a feedstock comprising (i) at least 1.2 wt % oxygen content, (ii) at least 50 ppm water, or (iii) both (i) and (ii), wherein the feedstock comprises at least 15% by weight of compounds containing at least 6 carbons. The second step is contacting the feedstock with a catalyst composition under conditions sufficient to (a) at least partially deoxygenate the feedstock, (b) at least partially hydroisomerize and/or dewax the feedstock, or (c) both (a) and (b). This forms a product that exhibits one or more, and preferably all, of the following properties: (i) an oxygen content at least 30% lower than the feedstock oxygen content; (ii) a branched (iso-) paraffin content that is at least 20% higher than the branched (iso-) paraffin content of the feedstock; (iii) a pour point of a diesel boiling range fraction thereof that is no greater than $-10°$ C.; and (iv) a cloud point of a diesel boiling range fraction thereof that is no greater than $-5°$ C. The catalyst composition utilized is capable of dewaxing and/or hydroisomerization and comprises a zeolitic support, at least one active metal compound comprising one or more of Group VIB metals and Group VIII metals deposited thereon, and a hydrophilic, hydrothermally-stable binder. The binder comprises one or more of (A) an oxide, carbide, nitride, phosphide, sulfide, or combination thereof of one or more metals selected from titanium, zirconium, vanadium, molybdenum, manganese, and cerium, (B) activated carbon, and/or (C) carbon on which is deposited one or more metals selected from titanium, zirconium, vanadium, molybdenum, manganese, and cerium.

BRIEF DESCRIPTION OF THE DRAWINGS

FIG. 1 shows comparative GC-MS spectra of a stearic acid feed converted using two different catalyst compositions having identical metal and support components but differing in the binder component.

DETAILED DESCRIPTION OF THE EMBODIMENTS

The present invention relates to catalyst compositions, and methods for using such catalyst compositions, to process feeds containing potentially problematic levels of oxygenated hydrocarbons and/or water. The processing of the feed can advantageously remove oxygen (i.e., lower the oxygen content of the feed) and/or form a hydroisomerized and/or dewaxed hydrocarbon product. It is noted that some hydroisomerization/dewaxing catalyst compositions can have difficulties retaining catalytic activity, chemical stability, and/or physical stability in the presence of oxygenates/water. However, it has been discovered that certain catalyst compositions, and particularly certain binder components, can be utilized to prevent, reduce, and/or inhibit losses in catalytic activity, chemical stability, and/or physical stability in hydroisomerization/dewaxing and/or deoxygenation processes. Catalytic hydroisomerization/dewaxing relates to the removal and/or isomerization of relatively long-chain, paraffinic molecules from feeds and can be accomplished by selectively cracking and/or by hydroisomerizing these relatively linear molecules.

In order to be effective in the methods according to the invention, catalyst compositions should be capable of hydroisomerization/dewaxing and/or oxygen removal vis-à-vis the feedstock. Optionally, the catalyst compositions according to the invention may additionally be capable of at least partially hydrocracking the feedstock. Catalyst compositions that are typically effective in the inventive methods can comprise a hydrophilic, hydrothermally-stable support such as a zeolitic support, at least one active metal compound comprising one or more of Group VIB metals and Group VIII metals deposited thereon, and a hydrophilic, hydrothermally-stable binder.

Zeolitic supports according to the present invention can include, but are not limited to crystalline aluminosilicates molecular sieves and/or 1-D or 3-D molecular sieve (for example, 10-member ring 1-D molecular sieves). Examples of suitable hydroisomerization/dewaxing supports can include, but are not limited to, ferrierite, mordenite, ZSM-5, ZSM-22 (also known as theta one or TON), ZSM-23, ZSM-35, ZSM-48, zeolite Beta, zeolite Y, USY, other Group IIA, IVB, VB, and/or VIB oxides, and combinations thereof (for example, molecular sieves such as ZSM-5, ZSM-22, ZSM-23, ZSM-35, ZSM-48, and combinations thereof, particularly molecular sieves such as ZSM-5, ZSM-48, and/or ZSM-23).

The at least one active metal compound, which typically includes a metal hydrogenation component, can comprise a Group VIII metal. Suitable Group VIII metals can include Pt, Pd, Ni, Co, or combinations thereof. In some embodiments, the catalyst composition can include at least 0.1 wt % of the Group VIII metal(s), for example at least about 0.3 wt %, at least about 0.5 wt %, at least about 1.0 wt %, at least about 2.5 wt %, or at least about 5.0 wt %. Additionally or alternately, the catalyst composition can include about 10.0 wt % or less of the Group VIII metal(s), for example about 5.0 wt % or less, about 2.5 wt % or less, about 1.5 wt % or less, or about 1.0 wt % or less.

In some embodiments, the catalyst composition can include as an additional hydrogenation component a Group VIB metal, such as W and/or Mo. Typically, the Group VIB metal(s) can be present when the Group VIII metal(s) comprise(s) a non-noble metal (such as Ni and/or Co). An example of such an embodiment could be a catalyst composition that includes the following metals: NiW, NiMo, or NiMoW. When present, the catalyst composition can include at least about 0.5 wt % of the Group VIB metal(s), for example at least about 1.0 wt %, at least about 2.5 wt %, or at least about 5.0 wt %. Additionally or alternately, the catalyst composition can include about 20.0 wt % or less of the Group VIB metal(s), for example about 15.0 wt % or less, about 10.0 wt % or less, about 5.0 wt % or less, or about 1.0 wt % or less. Where the catalyst composition contains only Group VIII metals, however, noble Group VIII metals (such as Pt and/or Pd) are the preferred Group VIII metals.

The binder portion of the catalyst composition, which can advantageously be hydrophilic and/or hydrothermally-stable, can comprise one or more metals selected from titanium, zirconium, vanadium, molybdenum, manganese, and cerium, activated carbon, and/or carbon on which is deposited one or more metals selected from titanium, zirconium, vanadium, molybdenum, manganese, and cerium. The form of the one or more metals may be metallic but typically comprises an oxide, carbide, nitride, phosphide, sulfide, or combination thereof (e.g., a combination of a carbide and nitride could be a nitrile; a combination of a phosphide and an oxide could be a phosphate, a phosphite, a hypophosphite, or the like). Preferably, but not necessarily, the binder comprises titania (aka titanium dioxide).

The catalysts compositions according to the present invention may consist essentially of the aforementioned components or may optionally contain additional components, such as sources of other transition metals (e.g., Group V metals such as niobium), sources of rare earth metals, organic ligands (e.g., as added or as precursors left over from oxidation and/or sulfidization steps), phosphorus compounds, boron compounds, fluorine-containing compounds, silicon-containing compounds, promoters, additional binders, fillers, or like agents, or combinations thereof. The Groups referred to herein refer to Groups of the CAS Version as found in the Periodic Table of the Elements in Hawley's Condensed Chemical Dictionary, $13^{th}$ Edition.

The feedstock used in the invention typically comprises at least 1.2 weight percent oxygen content and at least 50 ppm (often at least 2 weight percent) water content. Further, the feedstock typically comprises at least 15% by weight of compounds containing at least 6 carbons and, preferably, 12 carbons.

The feedstock can advantageously be a biofeed (e.g., a lipid material and/or a composition comprised of biological materials). However, in some embodiments, the feed can comprise both a biofeed portion and a mineral oil portion. By "mineral oil" is meant a fossil/mineral fuel source, such as crude oil, and not the commercial organic product, such as sold under the CAS number 8020-83-5, e.g., by Aldrich.

Generally, the biological materials that make up the biofeed can include vegetable fats/oils, animal fats/oils, fish oils, pyrolysis oils, and algae lipids/oils, as well as components of such materials. In some embodiments, the biofeed can include one or more type of lipid compounds, which are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Algae oils or lipids are typically contained in algae in the form of membrane components, storage products, and metabolites. Certain algal strains, particularly microalgae such as diatoms and cyanobacteria, contain proportionally high levels of lipids. Algal sources for the algae oils can contain varying amounts, e.g., from 2 wt % to 40 wt % of lipids, based on total weight of the biomass itself. Additionally or alternately, algae can be genetically modified to produce oils that are not lipids, e.g., that contain oxygenated hydrocarbons, such as wax esters, fatty ketones, fatty aldehydes, fatty alcohols, and the like. Further additionally or alternately, algae can be genetically modified to produce non-oxygenated hydrocarbons. In such cases, due to the genetic modifications, the algae may indeed exhibit an increased content of oil material and/or such oil material may advantageously have reduced oxygen content, compared to contents observable and/or attainable in conventional biomass.

Algal sources for algae oils include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Tetraselmis chui*, and *Chlamydomonas reinhardtii*. Additional or alternate nonlimiting examples of algae can include, but are not limited to, *Achnanthes, Amphiprora, Amphora, Ankistrodesmus, Asteromonas, Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Schizochytrium, Skeletonema, Spyrogyra, Stichococcus, Tetraselmis, Thraustochytrium, Viridiella*, and *Volvox* species.

Other examples of prokaryotic organisms (whether wild-type or genetically modified), which include cyanobacterial species, from which oils qualifying as algae oils herein can be isolated/derived can include, but are not limited to, one or more of the following species: *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema*, and *Xenococcus*.

In one embodiment where biofeed is present, the feedstock can include at least 0.5 wt % biofeed, based on total weight of the feedstock provided for processing into fuel, preferably at least 1 wt %, for example at least 2 wt %, at least 3 wt %, at least 4 wt %, at least 5 wt %, at least 10 wt %, at least 20 wt %, at least 30 wt %, at least 40 wt %, at least 50 wt %, at least 60 wt %, at least 70 wt %, at least 80 wt %, at least 90 wt %, at least 95 wt %, or at least 99 wt %. Additionally or alternately, the feedstock can be substantially (or completely) biofeed.

In embodiments where mineral oil is present in the feedstock, the feedstock can include not greater than 99.5 wt % mineral oil based on total weight of the feedstock, for example not greater than 99 wt %, not greater than 98 wt %, not greater than 97 wt %, not greater than 96 wt %, not greater than 95 wt %, not greater than 90 wt %, not greater than 85 wt % mineral oil, not greater than 80 wt %, not greater than 70 wt %, not greater than 60 wt %, not greater than 50 wt %, not greater than 40 wt %, not greater than 30 wt %, not greater than 20 wt %, not greater than 10 wt %, not greater than 5 wt %, or not greater than 1 wt %.

In some embodiments where biofeed is present, the biofeed can comprise a fatty acid alkyl ester. In such embodiments, the fatty acid alkyl ester can preferably comprise fatty acid methyl esters (FAME), fatty acid ethyl esters (FAEE), and/or fatty acid propyl esters.

When present, examples of mineral feedstock portions can include, but are not limited to, straight run (atmospheric) gas oils, vacuum gas oils, demetallized oils, coker distillates, cat cracker distillates, heavy naphthas (optionally but preferably at least partially denitrogenated and/or at least partially desulfurized), diesel boiling range distillate fraction (optionally but preferably at least partially denitrogenated and/or at least partially desulfurized), jet fuel boiling range distillate fraction (optionally but preferably at least partially denitrogenated and/or at least partially desulfurized), kerosene boiling range distillate fraction (optionally but preferably at least partially denitrogenated and/or at least partially desulfurized), coal liquids, and combinations thereof.

Additionally or alternately, the feedstock can have a boiling range from 250° F. (121° C.) to 800° F. (427° C.) (e.g., diesel plus kero cut), from 450° F. (232° C.) to 800° F. (427° C.) (e.g., diesel), or from 550° F. (288° C.) to 1100° F. (593° C.) (e.g., diesel plus heavier cut, such as an atmospheric gasoil, a vacuum gasoil, a light cycle oil, a heavy cycle oil, or the like, or a combination thereof). Further additionally or alternately, the initial boiling point of the feedstock can be at least 250° F. (121° C.), at least 350° F. (177° C.), at least 450° F. (232° C.), at least 500° F. (260° C.), or at least 550° F. (288° C.). Still further additionally or alternately, the T5 boiling point of the feed (i.e., the temperature at which 5 wt % of the feed boils) can be at least 250° F. (121° C.), at least 350° F. (177° C.), at least 450° F. (232° C.), at least 500° F. (260° C.), or at least 550° F. (288° C.). Still further additionally or alternately, the end boiling point of the feed can be 1100° F. (593° C.) or less, 1000° F. (538° C.) or less, 900° F. (482° C.) or less, 800° F. (427° C.) or less, or 700° F. (371° C.) or less. Yet further additionally or alternately, the T95 boiling point of the feed (i.e., the temperature at which 95 wt % of the feed boils) can be 1100° F. (593° C.) or less, 1000° F. (538° C.) or less, 900° F. (482° C.) or less, 800° F. (427° C.) or less, or 700° F. (371° C.) or less. In one embodiment, at least 90% by weight of the feedstock can have a boiling point between about 193° C. and about 360° C. (e.g., the T5 could be about 193° C. and the T95 about 360° C., or the T2 could be about 193° C. and the T98 about 360° C., or the like). The basic test method of determining the boiling points or ranges of such feedstock, as well as the fuel compositions produced according to this invention, can be by performing batch distillation according to ASTM D86-09e1, Standard Test Method for Distillation of Petroleum Products at Atmospheric Pressure.

Methods according to the invention include contacting the feedstock with the catalyst composition under conditions sufficient to at least partially deoxygenate the feedstock and/or to at least partially hydroisomerize and/or dewax the feedstock to form a product. In embodiments where deoxygenation occurs, a portion of the feed can be said to be converted (or subject to conversion) if oxygen is removed from that portion and/or if any oxygen remaining in that portion has been transformed into a different oxidation state or level. For example, a stearic acid feed can be said to be converted if at least a portion of the feed turns into one or more of stearic aldehyde, stearic alcohol, heptadecanol, octadecene, heptadecene, n-octadecane, n-heptadecane, a $C_{18}$ branched hydrocarbon, a $C_{17}$ branched hydrocarbon, and the like. In embodiments where hydroisomerization/dewaxing occurs without deoxygenation, conversion of a feed generally includes turning n-paraffinic (and optionally olefinic) hydrocarbons into olefinic and/or branched hydrocarbons. Additionally or alternately, in embodiments where hydroisomerization and/or dewaxing is performed, some level of cracking can occur, depending upon the capability(ies) of the catalyst composition.

In an embodiment, the conditions sufficient to at least partially deoxygenate the feedstock and/or to at least partially hydroisomerize and/or dewax the feedstock can comprise one or more of: a weight average bed temperature (WABT) from about 550° F. (about 288° C.) to about 800° F. (about 427° C.); a total pressure from about 300 psig (about 2.1 MPag) to about 3000 psig (about 20.7 MPag), for example from about 700 psig (about 4.8 MPag) to about 2000 psig (about 13.8 MPag); an LHSV from about 0.1 hr$^{-1}$ to about 20 hr$^{-1}$, for example from about 0.2 hr$^{-1}$ to about 10 hr$^{-1}$; and a hydrogen treat gas rate from about 500 scf/bbl (about 85 Nm$^3$/m$^3$) to about 10000 scf/bbl (about 1700 Nm$^3$/m$^3$), for example from about 750 scf/bbl (about 130 Nm$^3$/m$^3$) to about 7000 scf/bbl (about 1200 Nm$^3$/m$^3$) or from about 1000 scf/bbl (about 170 Nm$^3$/m$^3$) to about 5000 scf/bbl (about 850 Nm$^3$/m$^3$).

Treat gas, as referred to herein, can be either pure hydrogen or a hydrogen-containing gas, which contains hydrogen in an amount at least sufficient for the intended reaction purpose(s), optionally in addition to one or more other gases (e.g., nitrogen, light hydrocarbons such as methane, and the like, and combinations thereof) that generally do not adversely interfere with or affect either the reactions or the products. Impurities, such as $H_2S$ and $NH_3$, are typically undesirable and would typically be removed from, or reduced to desirably low levels in, the treat gas before it is conducted to the reactor stage(s). The treat gas stream introduced into a reaction stage can preferably contain at least about 50 vol % hydrogen, for example at least about 75 vol %, at least about 80 vol %, at least about 85 vol %, at least about 90 vol %, at least about 95 vol %, at least about 97 vol %, at least about 98 vol %, at least about 99 vol %, from 80 vol % to 100 vol %, from 80 vol % to 99.5 vol %, from 80 vol % to 99 vol %, from 85 vol % to 100 vol %, from 85 vol % to 99.5 vol %, or from 85 vol % to 99 vol %.

In some embodiments, one or more portions of the product (or perhaps even the entire product) of the methods according to the present invention can advantageously be used as one or more transportation fuel compositions and/or may be sent to one or more existing fuel pools. Non-limiting examples of such fuel compositions/pools can include, but are note limited to, diesel, kerosene, jet, heating oil, marine, and/or bunker fuels. For instance, in one embodiment, the distillate portion(s) of the product can be split (e.g., by fractionation or the like) into a kerosene cut having a boiling range between 400° F. (204° C.) and 550° F. (288° C.) and a diesel cut having a boiling range between 550° F. (232° C.) and 700° F. (371° C.).

Advantageously, the product of the methods according to the invention can exhibit an oxygen content at least 20% lower than the feedstock oxygen content, preferably at least 30% lower, for example at least 35% lower, at least 40% lower, at least 45% lower, at least 50% lower, at least 55% lower, at least 60% lower, at least 65% lower, at least 70% lower, at least 75% lower, at least 80% lower, at least 85% lower, at least 90% lower, at least 95% lower, at least 97% lower, or at least 99% lower. Additionally or alternately, the product can exhibit a branched (iso-) paraffin content that is at least 10% higher than the branched (iso-) paraffin content of the feedstock, preferably at least 20% higher, for example at least 25% higher, at least 30% higher, at least 35% higher, at least 40% higher, at least 45% higher, at least 50% higher, at least 55% higher, at least 60% higher, at least 65% higher, at least 70% higher, at least 75% higher, at least 80% higher, at least 85% higher, at least 90% higher, at least 95% higher, or at least 100% higher. Still further additionally or alternately, in cases where a diesel boiling range fraction of the product has been isolated, the diesel boiling range fraction can exhibit a pour point that is no greater than −5° C., preferably no greater than −10° C., for example no greater than −15° C., no greater than −20° C., no greater than −25° C., no greater than −30° C., no greater than −35° C., no greater than −40° C., no greater than −45° C., or no greater than −50° C. In such embodiments, the diesel boiling range fraction can additionally or alternately exhibit a pour point that is at least −55° C., for example at least −50° C., at least −45° C., at least −40° C., at least −35° C., at least −30° C., at least −25° C., at least −20° C., or at least −15° C. Yet further additionally or alternately, in cases where a diesel boiling range fraction of the product has been isolated, the diesel boiling range fraction can exhibit a cloud point that is no greater than 0° C., preferably no greater than −5° C., for example no greater than −10° C., no greater than −15° C., no greater than −20° C., no greater than −25° C., no greater than −30° C., no greater than −35° C., or no greater than −40° C. In such embodiments, the diesel boiling range fraction can additionally or alternately exhibit a cloud point that is at least −50° C., for example at least −45° C., at least −40° C., at least −35° C., at least −30° C., at least −25° C., at least −20° C., at least −15° C., or at least −10° C.

Any type of reactor suitable for deoxygenation, hydroisomerization, dewaxing, and/or any other desired reaction can be used to carry out the methods according to the invention. Examples of such reactors can include, but are not limited to, trickle bed, ebullating bed, moving bed, fluidized bed, and slurry reactors.

Additionally or alternately, the present invention can include the following embodiments.

Embodiment 1

A method for processing oxygenated hydrocarbons to remove oxygen and to form a hydroisomerized and/or dewaxed hydrocarbon product, which process comprises: providing a feedstock comprising (i) at least 1.2 wt % oxygen content, (ii) at least 50 ppm water content, or (iii) both (i) and (ii), wherein the feedstock comprises at least 15% by weight of compounds containing at least 6 carbons; contacting the feedstock with a catalyst composition under conditions sufficient to (a) at least partially deoxygenate the feedstock, (b) at least partially hydroisomerize and/or dewax the feedstock, or (c) both (a) and (b), to form a product that exhibits one or more of (iv) an oxygen content at least 30% lower than the feedstock oxygen content, (v) an iso-paraffin content that is at least 20% higher than the iso-paraffin content of the feedstock, (vi) a pour point of a diesel boiling range fraction thereof that is no greater than −10° C., and (vii) a cloud point of a diesel boiling range fraction thereof that is no greater than −5° C., wherein the catalyst composition is capable of hydroisomerization and/or dewaxing and comprises a zeolitic support, at least one active metal compound comprising one or more of Group VIB metals and Group VIII metals deposited thereon, and a hydrophilic, hydrothermally-stable binder comprising an one or more of (A) oxide, carbide, nitride, phosphide, sulfide, or combination thereof of one or more metals selected from titanium, zirconium, vanadium, molybdenum, manganese, and cerium, (B) activated carbon, and/or (C) carbon on which is deposited one or more metals selected from titanium, zirconium, vanadium, molybdenum, manganese, and cerium.

Embodiment 2

The method of embodiment 1, wherein the hydrophilic, hydrothermally-stable binder comprises zirconia, vanadia, titania, molybdenum oxide, manganese oxide, cerium oxide, carbon, or a combination thereof.

Embodiment 3

The method of embodiment 2, wherein the hydrophilic, hydrothermally-stable binder comprises titania.

Embodiment 4

The method of any one of the previous embodiments, wherein the zeolitic support comprises ZSM-5, ZSM-22, ZSM-23, ZSM-35, ZSM-48, zeolite Beta, zeolite Y, USY, mordenite, ferrierite, or a combination thereof.

Embodiment 5

The method of any one of the previous embodiments, wherein the contacting conditions include one or more of a weight average bed temperature from about 550° F. (about 288° C.) to about 800° F. (about 427° C.), a total pressure from about 350 psig (about 2.4 MPag) to about 2000 psig (about 13.8 MPag), an LHSV from about 0.1 hr$^{-1}$ to about 20 hr$^{-1}$, and a hydrogen treat gas rate from about 500 scf/bbl (about 85 Nm$^3$/m$^3$) to about 10000 scf/bbl (about 1700 Nm$^3$/m$^3$) based on pure hydrogen.

Embodiment 6

The method of any one of the previous embodiments, wherein one or more of the following are satisfied: the contacting is sufficient to both at least partially deoxygenate the feedstock and at least partially hydroisomerize and/or dewax the feedstock; the oxygen content of the product is at least 50% lower than the feedstock oxygen content; the iso-paraffin content is at least 30% higher than the iso-paraffin content of the feedstock; the pour point of a diesel fraction, at least 90% by weight of which has a boiling point between about 193° C. and about 360° C., is −15° C. or less, and the cloud point of a diesel fraction, at least 90% by weight of which has a boiling point between about 193° C. and about 360° C., is −10° C. or less.

Embodiment 7

The method of any one of the previous embodiments, wherein at least one active metal compound comprises either (i) a Group VIII noble metal selected from platinum and/or palladium or (ii) a Group VIII non-noble metal selected from nickel, cobalt, iron, and combinations thereof, and a Group VIB metal selected from molybdenum and/or tungsten.

Embodiment 8

The method of any one of the previous embodiments, wherein the catalyst composition consists essentially of a ZSM-48 catalyst, a source of palladium or platinum in a sufficient quantity to yield a metal content from about 0.1 wt % to about 3.0 wt %, based on the weight of the ZSM-48 catalyst, and a titania binder.

Embodiment 9

The method of any one of embodiments 1-7, wherein the catalyst composition consists essentially of a ZSM-48 catalyst, a source of Group VIII non-noble metal selected from nickel, cobalt, iron, and combinations thereof in a sufficient quantity to yield a Group VIII metals content from about 0.5 wt % to about 20 wt %, based on the weight of the ZSM-48 catalyst, optionally a source of Group VIB metal selected from molybdenum and/or tungsten in a sufficient quantity to yield a Group VIB metals content from about 3 wt % to about 25 wt %, based on the weight of the ZSM-48 catalyst, and a titania binder.

Embodiment 10

The method of any one of the previous embodiments, wherein the feedstock comprises one or more of at least 1.2 wt % oxygen content, at least 2 wt % water content, an iso-paraffin content less than that of the product, and at least 30% by weight of compounds containing at least 12 carbons.

Embodiment 11

The method of any one of the previous embodiments, wherein at least 50 wt % of the feedstock comprises oxygenates and/or hydrocarbons produced by a renewable source.

Embodiment 12

The method of embodiment 11, wherein the renewable source comprises algae.

Embodiment 13

The method of any one of the previous embodiments, wherein at least 90% by weight of the feedstock has a boiling point between about 193° C. and about 360° C.

Embodiment 14

The method of any one of the previous embodiments, wherein the steps comprise:
providing a feedstock comprising (i) at least 1.2 wt % oxygen content, (ii) at least 2 wt % water content, or (iii) both (i) and (ii), wherein the feedstock has a branched (iso-) paraffin content and the feedstock comprises at least 15% by weight of compounds containing at least 12 carbons;
contacting the feedstock with a catalyst composition under conditions sufficient to (a) at least partially deoxygenate the feedstock, (b) at least partially hydroisomerize and/or dewax the feedstock, or (c) both (a) and (b), to form a product that exhibits one or more of (iv) an oxygen content at least 30% lower than the feedstock oxygen content, (v) an iso-paraffin content that is at least 20% higher than the iso-paraffin content of the feedstock, (vi) a $C_{14}$-$C_{20}$ n-paraffin content of less than 0.5 wt %, (vii) a pour point of a diesel boiling range fraction thereof that is no greater than −10° C., and (viii) a cloud point of a diesel boiling range fraction thereof that is no greater than −5° C., wherein the catalyst composition is capable of hydroisomerization and/or dewaxing and comprises a zeolitic support, at least one active metal compound comprising one or more of Group VIB metals and Group VIII metals deposited thereon, and a hydrophilic, hydrothermally-stable binder comprising one or more of (A) an oxide, carbide, nitride, phosphide, sulfide, or combination thereof of one or more metals selected from titanium, zirconium, vanadium, molybdenum, manganese, and cerium, (B) activated carbon, and/or (C) carbon on which is deposited one or more metals selected from titanium, zirconium, vanadium, molybdenum, manganese, and cerium.

EXAMPLES

Example 1

Stearic acid feed was converted over a series of different catalyst compositions and at temperatures of about 250° C., about 275° C., about 300° C., and about 325° C. These catalyst compositions included <1 wt % Pt on alumina support/binder, <1 wt % Pt on ZSM-23 support (total metal on support was about 65% of catalyst weight) with titania binder (about 35% of catalyst weight), <1 wt % Pt on ZSM-48 support (total metal on support was about 65% of catalyst weight) with alumina binder (about 35% of catalyst weight), <1 wt % Pt on ZSM-48 support with titania binder, <1 wt % Pt on ZSM-5 support (total metal on support was about 65% of catalyst weight) with alumina binder (about 35% of catalyst weight), and ZSM-5 with no metal and no binder. At all temperatures tested, titania-containing (or, more broadly, non-alumina-containing) catalyst compositions exhibited higher conversion of the stearic acid feed than alumina-containing catalyst compositions. At about 275° C. and above, the titania- (non-alumina-) containing catalysts all exhibited conversion levels of at least 15% (for example from about 20% to about 95%), whereas alumina-containing catalysts exhibited conversion levels below 10%. These conversion levels were based on calculations involving mass balances, which can also be a good indicator for the oxygen content. As deoxygenation can occur via decarboxylation and dehydration, assuming complete loss of the formed $CO_2$ and water at the reaction/processing conditions, conversion levels (at least for the decarbonylation/decarboxylation reaction) can tend to increase with decreasing mass balance. Catalysts with binders that are not hydrophilic and/or not hydrothermally stable, such as alumina-containing catalysts, show very low activity for deoxygenation of such feeds.

Example 2

In Example 2, a direct comparison was made between the activity of two catalyst compositions that were identical, except for the binder. The first catalyst composition was <1 wt % Pt on ZSM-48 support with an alumina binder, whereas the second catalyst composition was <1 wt % Pt on ZSM-48 support with a titania binder. Stearic acid feed was converted over each catalyst at a temperature of about 325° C., with a weight hourly space velocity of about 0.3 hr$^{-1}$, and under a hydrogen partial pressure of about 400 psig (about 2.8 MPag).

The product was analyzed using a gas chromatograph linked to a mass spectrometer (GC-MS). The spectral comparison is shown in FIG. 1, with the titania binder at the top and the alumina binder at the bottom. The catalyst composition containing the titania binder showed substantially complete conversion of the feed from paraffin to branched (iso-) paraffin, with substantially complete deoxygenation as well. The pour point of this top sample was determined to be below about −50° C., based on analysis via differential scanning calorimetry (DSC), using a temperature rate of change of approximately 10° C./minute. The catalyst composition containing the alumina binder showed large amounts of unconverted stearic acid, with some limited deoxygenation but with only barely detectable (trace) amounts of conversion from paraffin to branched (iso-) paraffin. The pour point of this bottom sample was determined to be about +52° C., based on DSC analysis. For comparison, the pour point (melting point) of the stearic acid feed was about +69° C.

The principles and modes of operation of this invention have been described above with reference to various exemplary and preferred embodiments. As understood by those of skill in the art, the overall invention, as defined by the claims, encompasses other preferred embodiments not specifically enumerated herein.

What is claimed is:

1. A method for processing oxygenated hydrocarbons to remove oxygen and to form a hydroisomerized and/or dewaxed hydrocarbon product, which process comprise the following steps:
   (1) providing a feedstock comprising (i) at least 1.2 wt % oxygen content and (ii) a least 50 ppm water content, wherein the feedstock comprises at least 15% by weight of compounds containing at least 6 carbons; and
   (2) contacting the feedstock with a catalyst composition under conditions sufficient to (a) at least partially deoxygenate the feedstock, (b) at least partially hydroisomerize and/or dewax the feedstock, or (c) both (a) and (b), to form a product,
   wherein the product exhibits (iii) an oxygen content at least 30% lower than the feedstock oxygen content and one or more of (iv) an iso-paraffin content that is at least 20% higher than the iso-paraffin content of the feedstock, (v) a pour point of a diesel boiling range fraction thereof that is no greater than −10° C., and (vii) a cloud point of a diesel boiling range fraction thereof that is no greater than −5° C., and
   wherein the catalyst composition is capable of hydroisomerization and/or dewaxing and comprises a zeolitic support selected from the group consisting of ZSM-5, ZSM-23, ZSM-48, and combinations thereof at least one active metal compound, deposited thereon, comprising either a Group VIII noble metal comprising platinum and/or palladium or a combination of a Group VIII non-noble metal comprising nickel, cobalt, iron, and combinations thereof and a Group VIB metal comprising molybdenum and/or tungsten, and a hydrophilic, hydrothermally-stable binder comprising one or more of (A) an oxide, carbide, nitride, phosphide, sulfide, or combination thereof of one or more metals selected from titanium, zirconium, vanadium, molybdenum, manganese, and cerium, (B) activated carbon, and/or (C) carbon on which is deposited one or more metals selected from titanium, zirconium, vanadium, molybdenum, manganese, and cerium.

2. The method of claim 1, wherein the hydrophilic, hydrothermally-stable binder comprises zirconia, vanadia, titania, molybdenum oxide, manganese oxide, cerium oxide, carbon, or a combination thereof.

3. The method of claim 2, wherein the hydrophilic, hydrothermally-stable binder comprises titania.

4. The method of claim 1, wherein the zeolitic support comprises ZSM-23, ZSM-48, or a combination thereof.

5. The method of claim 1, wherein the contacting conditions include one or more of a weight average bed temperature from about 550° F. (about 288° C.) to about 800° F. (about 427° C.), a total pressure from about 350 psig (about 2.4 MPag) to about 2000 psig (about 13.8 MPag), an LHSV from about 0.1 $hr^{-1}$ to about 20 $hr^{-1}$, and a hydrogen treat gas rate from about 500 scf/bbl (about 85 $Nm^3/m^3$) to about 10000 scf/bbl (about 1700 $Nm^3/m$) based on pure hydrogen.

6. The method of claim 1, wherein one or more of the following are satisfied: the contacting is sufficient to both at least partially deoxygenate the feedstock and at least partially hydroisomerize and/or dewax the feedstock; the oxygen content of the product is at least 50% lower than the feedstock oxygen content; the iso-paraffin content is at least 30% higher than the iso-paraffin content of the feedstock; the pour point of a diesel fraction, at least 90% by weight of which has a boiling point between about 193° C. and about 360° C., is −15° C. or less, and the cloud point of a diesel fraction, at least 90% by weight of which has a boiling point between about 193° C. and about 360° C., is −10° C. or less.

7. The method of claim 1, wherein the catalyst composition consists essentially of a ZSM-48 catalyst, a source of palladium or platinum in a sufficient quantity to yield a metal content from about 0.1 wt % to about 3.0 wt %, based on the weight of the ZSM-48 catalyst, and a titania binder.

8. The method of claim 1, wherein the catalyst composition consists essentially of a ZSM-48 catalyst, a source of Group VIII non-noble metal selected from nickel, cobalt, iron, and combinations thereof in a sufficient quantity to yield a Group VIII metals content from about 0.5 wt % to about 20 wt %, based on the weight of the ZSM-48 catalyst, optionally a source of Group VIB metal selected from molybdenum and/or tungsten in a sufficient quantity to yield a Group VIB metals content from about 3 wt % to about 25 wt %, based on the weight of the ZSM-48 catalyst, and a titania binder.

9. The method of claim 1, wherein the feedstock comprises one or more of at least 1.2 wt % oxygen content, at least 2 wt % water content, an iso-paraffin content less than that of the product, and at least 30% by weight of compounds containing at least 12 carbons.

10. The method of claim 1, wherein at least 50 wt % of the feedstock comprises oxygenates and/or hydrocarbons produced by a renewable source.

11. The method of claim 10, wherein the renewable source comprises algae.

12. The method of claim 1, wherein at least 90% by weight of the feedstock can have a boiling point between about 193° C. and about 360° C.

13. The method of claim 1, comprising the following steps:
(1) providing a feedstock comprising (i) at least 1.2 wt % oxygen content and (ii) at least 2 wt % water content, wherein the feedstock has a branched (iso-) paraffin content and the feedstock comprises at least 15% by weight of compounds containing at least 12 carbons; and
(2) contacting the feedstock with a catalyst composition under conditions sufficient to (a) at least partially deoxygenate the feedstock, (b) at least partially hydroisomerize and/or dewax the feedstock, or (c) both (a) and (b), to form a product,
wherein the product exhibits (iv) an oxygen content at least 30% lower than the feedstock oxygen content and one or more of (v) an iso-paraffin content that is at least 20% higher than the iso-paraffin content of the feedstock, (vi) a $C_{14}$-$C_{20}$ n-paraffin content of less than 0.5 wt %, (vii) a pour point of a diesel boiling range fraction thereof that is no greater than −10° C., and (viii) a cloud point of a diesel boiling range fraction thereof that is no greater than −5° C., and
wherein the catalyst composition is capable of hydroisomerization and/or dewaxing and comprises a zeolitic support selected from the group consisting of ZSM-5, ZSM-23, ZSM-48, and combinations thereof, at least one active metal compound, deposited thereon, comprising either a Group VIII noble metal comprising platinum and/or palladium or a combination of a Group VIII non-noble metal comprising nickel, cobalt, iron, and combinations thereof, and a Group VIB metal comprising molybdenum and/or tungsten, and a hydrophilic, hydrothermally-stable binder comprising one or more of (A) an oxide, carbide, nitride, phosphide, sulfide, or combination thereof of one or more metals selected from titanium, zirconium, vanadium, molybdenum, manganese, and cerium, (B) activated carbon, and/or (C) carbon on which is deposited one or more metals selected from titanium, zirconium, vanadium, molybdenum, manganese, and cerium.

14. The method of claim 1, wherein the product in step (2) is itself a transportation fuel product and/or is sent to a pool as a blend component in a transportation fuel, with the transportation fuel product and/or pool comprises diesel, kerosene, and/or jet fuels.

* * * * *